United States Patent
Nishii (10) Patent No.: US 6,698,950 B2
(45) Date of Patent: *Mar. 2, 2004

(54) IMAGE FORMING APPARATUS CAPABLE OF CONTROLLING PRINTING DATA FROM AN EXTERNAL TERMINAL ONTO A RECORDING MEDIUM AND PRINTING DATA FROM A COPIER FUNCTIONAL DEVICE ONTO A RECORDING MEDIUM

(75) Inventor: Wataru Nishii, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/885,312

(22) Filed: Jun. 20, 2001

(65) Prior Publication Data

US 2001/0053301 A1 Dec. 20, 2001

(30) Foreign Application Priority Data

Jun. 20, 2000 (JP) .......................... 2000-184870

(51) Int. Cl.⁷ ................................ B41J 11/44
(52) U.S. Cl. ................... 400/63; 400/61; 400/70; 400/74; 400/76
(58) Field of Search .............. 400/63, 61, 70, 400/74, 76; 399/80

(56) References Cited

U.S. PATENT DOCUMENTS

| 4,642,792 A | * | 2/1987 | Clements et al. | ......... 358/1.18 |
|---|---|---|---|---|
| 4,708,461 A | * | 11/1987 | Okuda et al. | ............. 399/87 |
| 6,151,464 A | * | 11/2000 | Nakamura et al. | ........ 399/79 |
| 6,233,408 B1 | * | 5/2001 | Allen | .................... 399/15 |

FOREIGN PATENT DOCUMENTS

| JP | 63-18911 | 4/1988 |
|---|---|---|
| JP | 05-273338 | 10/1993 |
| JP | 10-16355 | 1/1998 |

OTHER PUBLICATIONS

U.S. patent application Publication US 2001/0048823 A1 to Nomura et al., Dec. 2001, see front page diagram and claims 1–10.*

* cited by examiner

Primary Examiner—Charles H. Nolan, Jr.
(74) Attorney, Agent, or Firm—David G. Conlin; William J. Daley, Jr.; Edwards & Angell, LLP (57) ABSTRACT

A printer implements printing(printer jobs) of the data received from personal computers and printing(copier jobs) of the data scanned through a copier functional device. When a user approaches the printer, a user identifying portion identifies the ID number(user name) of this user. If a printer job of this user name has been registered in the management memory of the printer, it is determined whether the printer job of this user name is 'allowed' to make an interrupt and whether the priority of this printer job is higher than that of the copier job. After confirmation of these facts, the printer job of this user name is started by making an interrupt.

8 Claims, 9 Drawing Sheets

Copier job

| Reception time | User name | Priority | Page count |
|---|---|---|---|
| 9/28/98 09:56 | FUJIHARA | C | 500 |

21C

21P

Printer job

| Reception time | User name | Priority | Page count | ID waiting | Job interrupt |
|---|---|---|---|---|---|
| 9/28/98 09:40 | NISHI | D | 2 | ○ | ○ |
| 9/28/98 09:51 | FUJIMURA | C | 3 | ○ | — |
| 9/28/98 10:00 | OCHI | B | 20 | — | ○ |

FIG. 4

| Job reception/user recognition time | Printout completion time | User name | Page count | Job |
|---|---|---|---|---|
| 9/28/98 09:40 | | NISHII | 3 | Printer |
| 9/28/98 09:51 | | FUJIMURA | 3 | Printer |
| 9/28/98 09:56 | | FUJIHARA | 500 | Copier |
| 9/28/98 10:00 | | OCHI | 20 | Printer |

FIG. 5

| Job reception/user recognition time | Printout completion time | User name | Page count | Job |
|---|---|---|---|---|
| 9/28/98 09:40 | | NISHII | 2 | Printer |
| 9/28/98 09:51 | | FUJIMURA | 3 | Printer |
| 9/28/98 09:56 | 9/28/98 10:15 | FUJIHARA | 500 | Copier |
| 9/28/98 10:00 | 9/28/98 10:01 | OCHI | 20 | Printer |
| 9/28/98 10:01 | — | YAGI | — | — |
| 9/28/98 10:04 | — | YAGI | — | — |
| 9/28/98 10:05 | | FUKUMOTO | 1 | Printer |
| 9/28/98 10:20 | | SUNAYAMA | 100 | Copier |

FIG. 6

Copier job

| Reception time | User name | Priority | Page count |
|---|---|---|---|
| 9/28/98 10:20 | SUNAYAMA | E | 100 |

Printer job

| Reception time | User name | Priority | Page count | ID waiting | Job interrupt |
|---|---|---|---|---|---|
| 9/28/98 09:40 | NISHI | D | 2 | O | O |
| 9/28/98 09:51 | FUJIMURA | C | 3 | O | — |
| 9/28/98 10:05 | FUKUMOTO | A | 1 | O | O |

| Job reception/user recognition time | Printout completion time | User name | Page count | Job |
|---|---|---|---|---|
| 9/28/98 09:40 | 9/28/98 10:22 | NISHII | 3 | Printer |
| 9/28/98 09:51 | | FUJIMURA | 3 | Printer |
| 9/28/98 09:56 | 9/28/98 10:15 | FUJIHARA | 500 | Copier |
| 9/28/98 10:00 | 9/28/98 10:01 | OCHI | 20 | Printer |
| 9/28/98 10:01 | — | YAGI | — | — |
| 9/28/98 10:04 | — | YAGI | — | — |
| 9/28/98 10:05 | 9/28/98 10:36 | FUKUMOTO | 1 | Printer |
| 9/28/98 10:20 | 9/28/98 10:24 | SUNAYAMA | 100 | Copier |
| 9/28/98 10:22 | — | NISHII | — | — |
| 9/28/98 10:36 | — | FUKUMOTO | — | — |

FIG. 9

Copier job

| Reception time | User name | Priority | Page count |
|---|---|---|---|
| 9/28/98 10:20 | SUNAYAMA | D | 100 |

Job interrupt

Printer job

| Reception time | User name | Priority | Page count | ID waiting | Job interrupt |
|---|---|---|---|---|---|
| 9/28/98 09:40 | NISHII | D | 2 | ○ | — |
| 9/28/98 09:51 | FUJIMURA | C | 3 | ○ | ○ |
| 9/28/98 10:05 | FUKUMOTO | A | 1 | ○ | ○ |

FIG. 10

Machine name: XX-XXXXX

Machine usage status
- User : FUJIHARA
- Priority : C
- Total copy count : about 500 sheets
- Required time : about 15 min.

Send message   Close

IMAGE FORMING APPARATUS CAPABLE OF CONTROLLING PRINTING DATA FROM AN EXTERNAL TERMINAL ONTO A RECORDING MEDIUM AND PRINTING DATA FROM A COPIER FUNCTIONAL DEVICE ONTO A RECORDING MEDIUM

BACKGROUND OF THE INVENTION (1) Field of the Invention

The present invention relates to a printer which prints the data input through an external terminal onto recording paper and prints the data captured through a scanner onto recording paper.

(2) Description of the Prior Art

Recently, in the OA equipment use environment, a printer or multi-functional apparatus having a printer function is connected to various kinds of terminals such as personal computers, different types of portable terminals, facsimile machines and the like, using a network. The printer, when receiving a print request of data to be recorded from these terminals, and produces printouts of their data onto recording paper. Further, a printer or multi-functional apparatus has a copier function, that is, the function of scanning original images and print them on recording paper. However, referring to practical situations of such printers or multi-functional apparatus being used, a large number of recording sheets with various records of data and images printed thereon are presented together at the paper output port. Therefore, when coming and taking the necessary recording paper of records of data or images, the users must seek the necessary paper from the stacks of recording paper.

To deal with such a situation, in a facsimile machine disclosed in Japanese Patent Publication Sho 63 No. 18911, a multiple number of output receptacles for receiving recording sheets are provided to distinguish one output from others depending on the operational modes such as printer mode, facsimile mode, copier mode and the like. In this case, recording paper will not cause mix-up outside their operational modes. However, in view of each operational mode, there are still cases where a large number of recording sheets become piled up. Particularly, for the printer function, which receives data to be recorded from external terminals and makes recordings the users are usually present away from the place where the machine is. Therefore many sheets of recording paper are liable to be left behind and pile up because it takes time for the users to come and pick the paper up or some users may forget all about it without fetching the recording paper.

In the system disclosed in Japanese Patent Application Laid-Open Hei 10 No. 16355, the print server receives data to be recorded from external terminals via the network and stores and manages the data and when a user having an ID card approaches the print server, it detects the ID number from this ID card and searches for the data specified with that ID number and records the data on the recording paper. In this case, since printing of data starts when the user comes to the print server, it is possible to avoid a large number of recorded sheets piling up and being left behind.

The print server of the above conventional system dedicatedly functions to print out the data from external terminals, without having other functions such as a copier function etc., as stated above. That is, this conventional system is not the one which totally manages print requests from different terminals and print requests for copying operations.

Moreover, the above conventional facsimile only deals with multiple print requests in the order of their occurrences and has nothing over and above that function. The above conventional system with the print server deals with a print request only when the user approaches the print server and has nothing over and above that function. Therefore, the combination of these technologies will not be able to realize management of giving priority to one of print requests over others as appropriate when a multiple number of printing requests occur at almost the same time.

SUMMARY OF THE INVENTION

The present invention has been devised in view of the above conventional problems, it is therefore an object of the present invention to provide a printer capable of managing to sequentially process a multiple number of print requests from a variety of terminals and for copying operations, by appropriately giving priority to these print requests.

In order to achieve the above object, the present invention is configured as follows:

In accordance with the first aspect of the present invention, a printer connected to a terminal device via a network line, includes: a display means, wherein a message input through the terminal device is given to the printer via the network line so that the message is displayed in the display means.

In accordance with the second aspect of the present invention, a printer having a multiple number of input functional devices connected thereto and producing printouts from the data to be recorded input through these input functional devices, includes:

an identifying means which identifies the user when a user of one of the input functional devices approaches the printer;

a comparing means which, after the user is identified by the identifying means, compares the priority of the input functional device of the user with that of another input functional device through which other data to be recorded has been input to the printer, based on the priority rules determined beforehand in relation with the input functional devices; and a job interrupt means which starts the printing of the data to be recorded input through the input functional device of the user by making a job interrupt when the priority of the input functional device of the user is determined by the comparing means to be higher than that of the other input functional device through which other data to be recorded has been input to the printer.

In accordance with the third aspect of the present invention, a printer having the above second feature further includes: a display means which, while printing of a job is being implemented by job interrupt, displays the identification data identifying the user and that the printing job in progress is implemented in a job interrupt mode.

In accordance with the fourth aspect of the present invention, a printer having a multiple number of input functional devices connected thereto and producing printouts from the data to be recorded input through these input functional devices, includes:

an identifying means which identifies the user when a user of one of the input functional devices approaches the printer;

a usage status displaying means which, after the user is identified by the identifying means, displays the input functional device of the identified user and another input functional device through which other data to be recorded has been input to the printer;

a control means for designating job interrupt for implementation of the printing job of the data input through the input functional device of the user; and a job interrupt means which, when job interrupt is designated by the control means, starts the printing of the data input through the input functional device of the user by making an interrupt.

In accordance with the fifth aspect of the present invention, a printer having the above second or fourth feature further includes: a notifying means for giving a notice as to the print status of the other input functional device through which data to be recorded has been input to external terminals.

In accordance with the sixth aspect of the present invention, a printer having the above second or fourth feature further includes: a message display means for displaying messages from external terminals.

In accordance with the seventh aspect of the present invention, a printer having the above second or fourth feature further includes: a log and user name display means for displaying past records of printing operations of the printer and the users identified by the identifying means.

In accordance with the eighth aspect of the present invention, a printer having the above second or fourth feature further includes: a notifying means for giving information as to past records of printing operations of the printer and the users identified by the identifying means, to external terminals.

According to the present invention thus configured, when a user approaches the printer, this user is identified so as to determine whether the priority of the input functional device of the user is higher than the other input functional device through which data to be recorded has been input. If the priority of the input functional device of this user is higher than the others, the printing of the data input through the input functional device of the user is started by making an interrupt. For example, suppose the input functional device of a user is an external terminal that supplies data to be recorded to the printer via the network and another input functional device is an entity that scans original images by the copier function and supplies data to the printer. When a user approaches the printer after those data have been sent to be recorded from the external terminal and is identified and if the input functional device of the user has a higher priority, the printing of the data sent from the external terminal is started by interrupting the printing of images by the copier function even if it is in progress. Therefore, the user dose not have to wait.

Further, in the present invention, provision of the display means makes it possible for the user to correctly and immediately notice the occurrence of the job interrupt so that it is possible to timely collect the printed sheets of the data produced by the job interrupt mode from those produced by the interrupted job, avoiding mix-up of one by the other. Further this configuration makes it possible for two or more users, if approaching the printer at the same time, to know whose job of data is being currently implemented.

Moreover, in the present invention, if a user approaches the printer, this user is identified so that the input functional device of the user and other input functional device through which data to be recorded has been input are displayed. When printing of the data input through the input functional device of the user is commanded to start by making an interrupt, the printing of the data is started in the job interrupt mode. For example, suppose the input functional device of a user is an external terminal that supplies data to be recorded to the printer via the network and another input functional device is an entity that scans original images by the copier function and supplies data to the printer. When a user approaches the printer after those data have been sent to be recorded from the external terminal and is identified, the printing of the data of the user is started in response to the command of allowing the printing job of the data of the user to make an interrupt, by interrupting the printing of images by the copier function. Therefore, the user dose not have to wait.

Since a job interrupt is designated by the user, it is possible to make an interrupt taking into account the printing status of images by the copier function. Therefore, the user is able to avoid an abrupt interruption.

Still more, since the print status and messages can be exchanged between the printer and external terminals and displayed in both, it is possible on the external terminal side to determine whether a job interrupt for a printing job may be approved without going to the printer site. Also it is possible to send a message from a user on one external terminal to other printer users.

Finally, according to the present invention, the display means and notifying means for displaying and notifying the information of the identified user are further provided. The past records of printing operations and the user identified by the identifying means are mere examples of the print status. Based on the print status, it is possible to postulate the person involved, if, for example, someone by mistake carried away a printout of another person. In such a case, an e-mail of the inquiry message can be sent via the network to the terminal of the person, or the terminals of all the people, who might have carried away the printout by mistake.

DESCRIPTION OF THE PREFERRED EMBODIMENTS

The embodiment of the present invention will hereinafter be described in detail with reference to the accompanying drawings.

Figure 1:
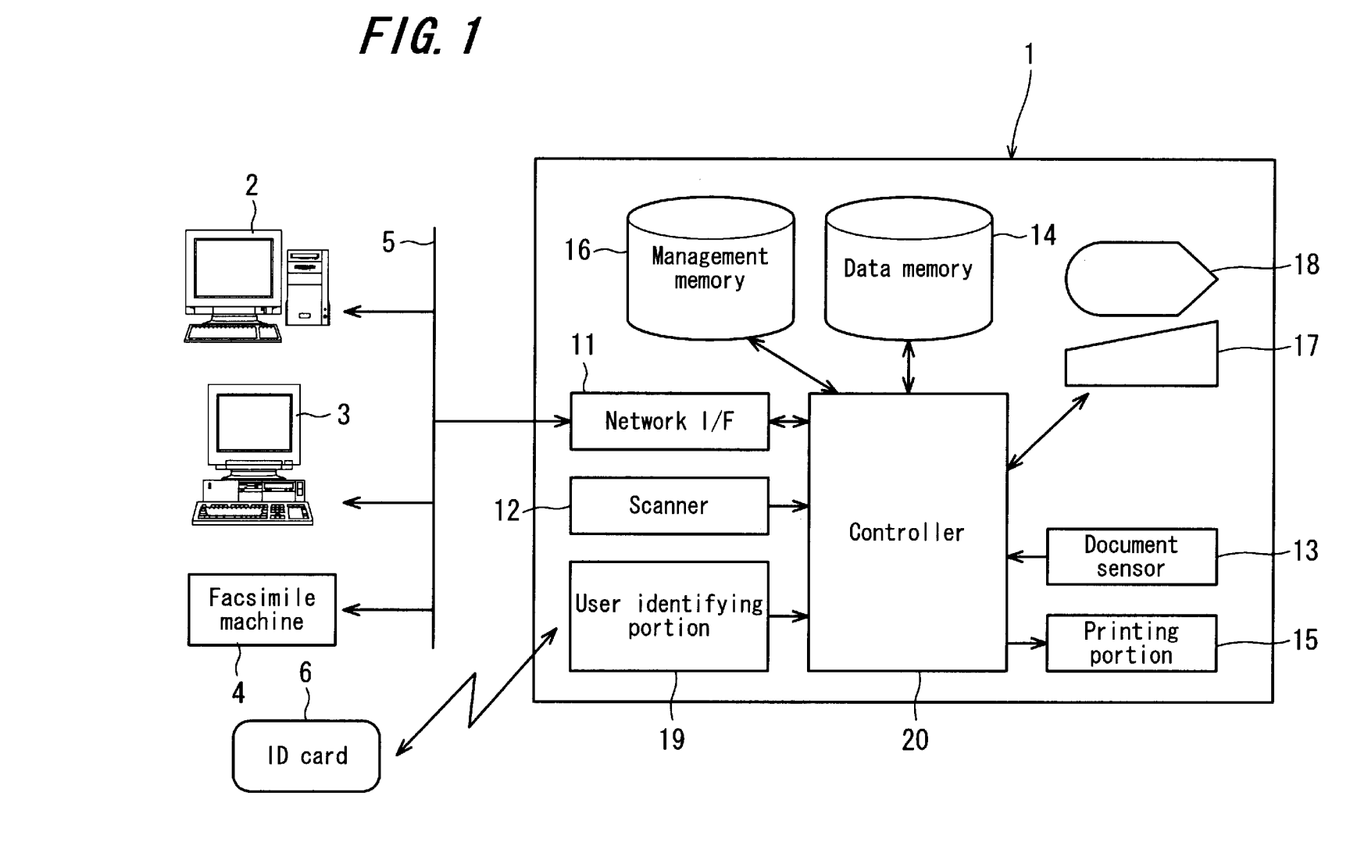
FIG. 1 is a block diagram showing a network system to which one embodiment of a printer of the present invention is applied.

FIG. 1 is a block diagram showing a network system to which one embodiment of a printer of the present invention is applied. In this network system, a printer 1, personal computers 2 and 3 and a facsimile machine 4 are connected to each other by way of a network line 5. Printer 1 is able to exchange certain data with ID cards 6 by radiocommunication.

This network system is used by a multiple number of users. The users have their own ID cards 6, each having a unique ID number registered therein.

Printer 1 includes a network I/F 11 connected to network line 5, a scanner 12 and document sensor 13 for copier function, a data memory 14 for temporarily storing data to be printed, a printing portion 15 for printing data to be recorded on recording paper, a management memory for storing various management information, a control portion 17, a display portion 18, a user identifying portion 19 for performing radiocommunication with ID cards 6 and a controller 20 for totally controlling this printer 1.

Personal computers 2 and 3 are used by respective users, and the ID number of these users are stored beforehand. Personal computer 2 sends data to be recorded with its user ID number to printer 1 via network line 5. Similarly, personal computer 3 also sends data to be recorded with its user ID number to printer 1.

Since facsimile machine 4 is not used by a particular user, only data to be recorded is sent to printer 1 via network line 5.

In printer 1, network I/F 11 receives the data to be recorded with its ID number transferred via network line 5 and the data and ID number are stored via control portion 20 into data memory 14 and management memory 16, respectively.

When the copier function is used, the user operates control portion 17 of printer 1 and inputs the ID number of the user and commands a copying operation. In response to this, document sensor 13 detects the original set on an unillustrated original table. Scanner 12 scans the image of the original and outputs the data to be recorded of the read image. Controller 20 stores the data representing the image and the user's ID into data memory 14 and management memory 16.

The various pieces of data to be recorded thus stored in data memory 14 is loaded as appropriate by controller 20 to be supplied to printing portion 15. Printing portion 15 is constituted by a laser beam printer, for example, and records images, characters symbols etc., represented by the data, onto recording paper.

Figure 2:
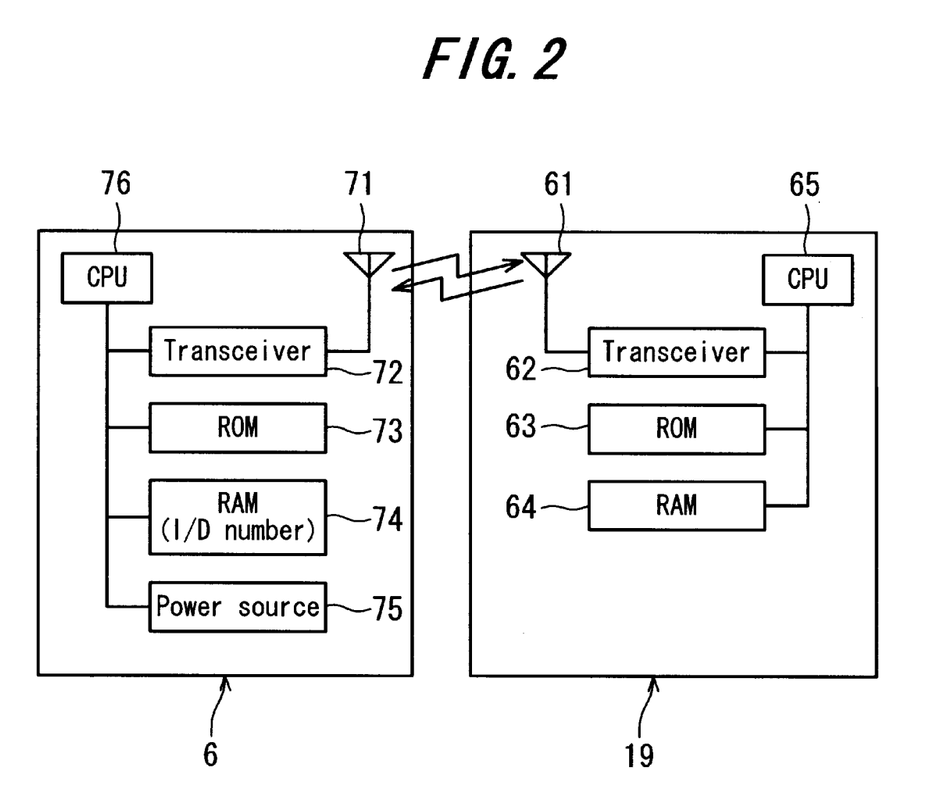
FIG. 2 is a block diagram showing a configuration of a user identifying portion and an ID card in the printer of the present embodiment.

FIG. 2 shows a configuration of a user identifying portion 19 and ID card 6. User identifying portion 19 is comprised of an antenna 61, a transceiver 62, a ROM 63 storing the operational programs etc. for user identifying portion 19, a RAM 64 for storing various pieces of data and a CPU 65 for totally controlling the user identifying portion 19. CPU 65 is able to exchange control signals and data signals via transceiver 62 and antenna 61.

ID card 6 is comprised of an antenna 71, a transceiver 72, a ROM 73 storing the operational programs etc. for user ID card 6, a RAM 74 for storing various pieces of data and the ID number of the user with the ID card 6, a power source 75 and a CPU 76 for totally controlling the ID card 6. CPU 76 of ID card 6 is able to exchange control signals and data signals via transceiver 72 and antenna 71.

Control signals and data signals between user identifying portion 19 and ID card 6 can be exchanged by radiocommunication only when the ID card approaches to user identifying portion 19 within its radio wave communication coverage.

CPU 65 of user identifying portion 19 sends the ID request signal to unspecified users with ID cards 6 from transceiver 62 via antenna 61. CPU 76 of ID card 6 is in the waiting mode at any time, and when the user with the ID card walks about and enters the radio wave communication coverage of user identifying portion 19, the ID card 6 receives the ID request signal through antenna 71 and transceiver 72. CPU 76 of ID card 6, in response to this ID request signal, reads out the user's ID number from the RAM 74 and sends its ID number signal from transceiver 72 via antenna 71. CPU 65 of user identifying portion 19 receives this ID number signal by transceiver 62 via antenna 61 and gives this ID number to controller 20. Controller 20 checks whether this given ID number matches one of the ID numbers stored in management memory 16. If there is a match, it is determined that the user having the given ID number has approached printer 1.

The technique for detecting the ID number has been disclosed in detail in Japanese Patent Application Laid-Open Hei 5 No. 273338, which was previously applied by the applicant of the present invention.

Here, each piece of data to be recorded transferred from personal computers 2 and 3 is stored along with an associated user ID number into data memory 14. Similarly, the data scanned through the copier function is also stored along with an associated user ID number into data memory 14.

Figure 3:
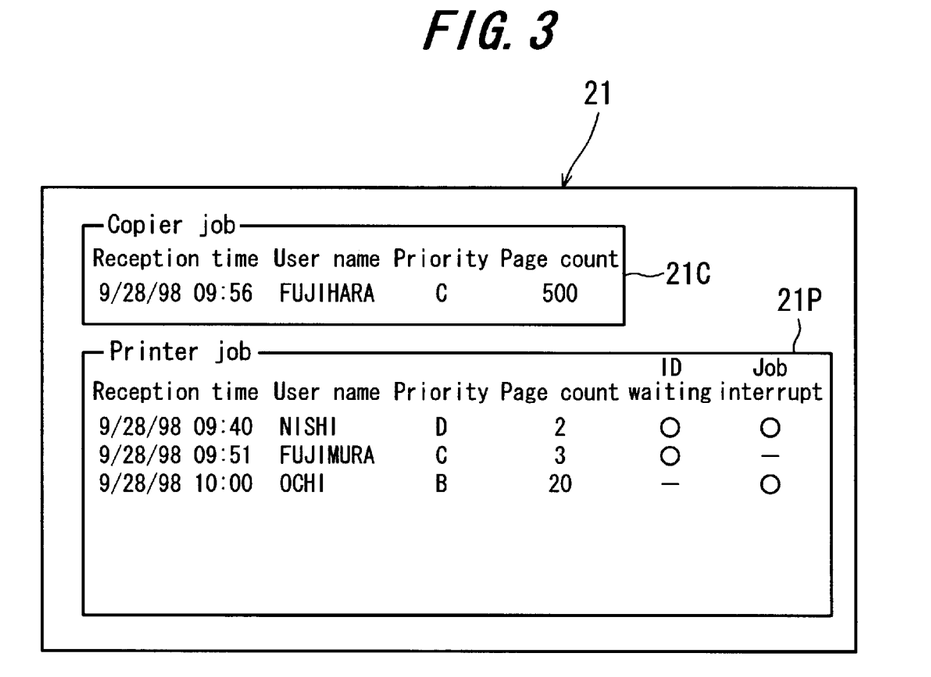
FIG. 3 is a diagram showing the content of a management table in the printer of the present embodiment.

When a piece of data to be recorded with its ID number is stored into data memory 14, controller 20 forms a management table 21 as shown in FIG. 3 in management memory 16. This management table 21 is composed of a printer job table 21P and copier job table 21C.

A printer job indicates a printing operation of data to be recorded transferred from any of personal computers 2 and 3. In this printer job table 21P, the reception time at which data to be recorded is transferred from personal computer 2 or 3, user name, priority, page count of recording paper to be printed, whether or not the ID number waiting function is needed and whether or not the job is allowed to create an interrupt are recorded.

A copier job indicates a printing operation of data scanned by the copier function. Recorded in this copier job table 21C are the reception time at which a copier function is ordered through control portion 17, user name, priority and page count of recording paper to be printed.

The user names and their priorities are previously registered in association with user's ID numbers in the management memory 16. When a certain piece of data to be recorded is recorded in the data memory 14 with the ID number, the user name and their priority in accordance with the this ID number is searched for in management memory 16 and the detected user name and priority are written into management table 21. When a printer job is requested from a personal computer, whether or not the ID number waiting function is needed and whether or not the job is allowed to create an interrupt are also designated through the same computer and written into management table 21.

Figure 4:
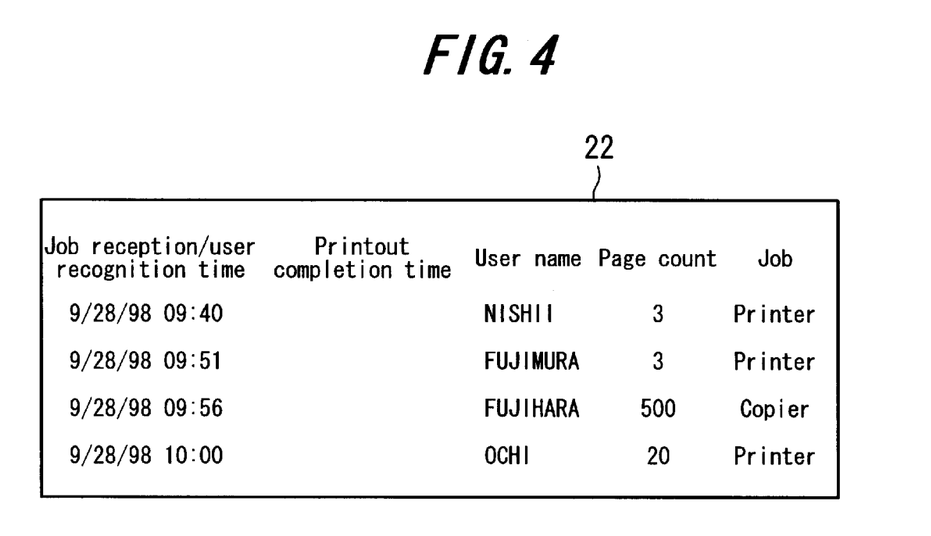
FIG. 4 is a diagram showing the content of a reception/identification table in the printer of the present embodiment.

Controller 20 creates a reception/identification table 22 in management memory 6, as shown in FIG. 4. In this reception/identification table 22, the reception time at which data to be recorded is transferred from personal computer 2 or 3, the reception time at which a copier function is ordered through control portion 17 and the recognition time when the ID number of the user who approaches printer 1 is identified, are registered sequentially along with the printout completion time at which the data to be recorded has been printed onto recording paper, user name, page count and the job type, either a printer job or copier job.

In the printer 1 thus configured, while a copier job, or printing of data to be recorded by the copier function is performed, a series of operations from scanning of data to printing are smoothly executed as long as no job interrupt occurs. For example, registered in table 21C of copier jobs in FIG. 3 was a copier job specified by reception time 09:56, a user name of 'FUJIHARA', C-level priority and a page count of 500. No job interrupt exited at that point of the reception time 09:56. Therefore, the data specified by the user name 'FUJIHARA' was loaded from data memory 14 and supplied to printing portion 15, where the printing of this data was started without delay.

On the other hand, when data to be recorded is received from a personal computer while a copier job is being executed and the printing of the data should be started immediately after the time of receiving, the copier job is interrupted so as to allow the printer job of the data from the personal computer to be executed, and then the interrupted copier job is restarted after the interrupting printer job has been completed. For example, registered in table 21P of printer jobs in FIG. 3 was a printer job specified by reception time 10:00, a user name of 'OCHI', B-level priority, a page count of 20, having no request for the ID-number waiting function and being 'allowed' to create an interrupt. When the ID-number waiting function is not requested, there is no need to wait for the user with this ID number to approach to printer 1. Since this printer job was allowed to create an interrupt and had a higher priority, B-level priority, which is higher than C-level priority of the copier job. In this case, this printer job was allowed to directly interrupt the copier job. Therefore, at the reception time 10:00, the printing of the data specified by the user name 'FUJIHARA' registered in the copier job table 21C descried above, was interrupted so that the printing of the data registered in the printer job table 21P and specified by the user name 'OCHI' was allowed to start, and the interrupted printing of the data specified by the user name 'FUJIHARA' was restarted after the printing of the data specified by the user name 'OCHI' had been completed.

Figure 5:
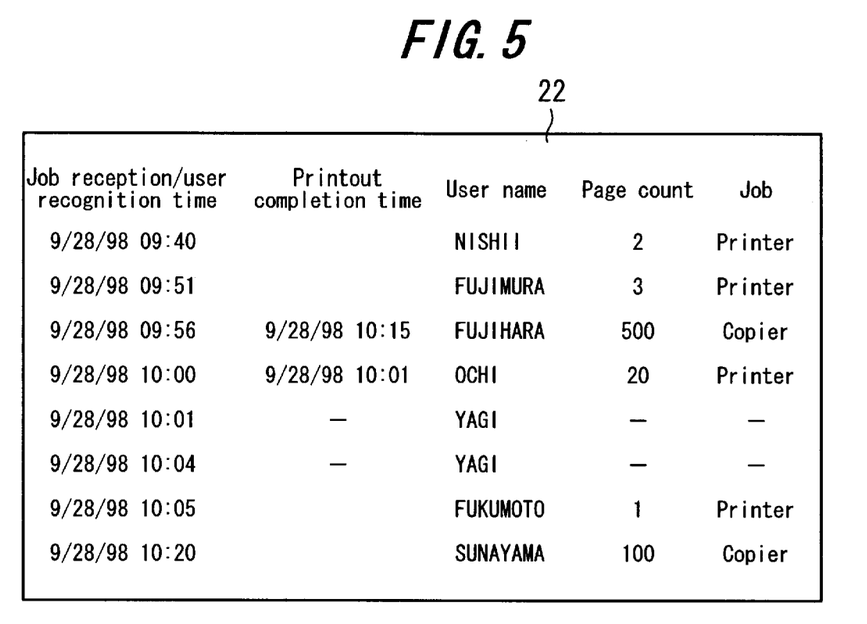
FIG. 5 is a diagram showing the reception/identification table shown in FIG. 4 with its content updated.

Here, assuming, for example, that the interrupting printing of the data specified by the user name 'OCHI' completed at time 10:01 and the restarted printing of the data specified by the user name 'FUJIHARA' completes at time 10:15, the content in reception/identification table 22 shown in FIG. 4 was updated to that shown in FIG. 5. In the reception/identification table 22 in FIG. 5, time 10:01 at which printing of the data specified by the user name 'OCHI' ended and time 10:15 at which printing of the data specified by the user name 'FUJIHARA' ended was recorded as the printout completion time.

In the reception/identification table 22 shown in FIG. 5, the user name 'YAGI' alone was registered at time 10:01 and at time 10:04. This indicates that a user having a user name 'YAGI' approached printer 1 at these times and the ID number of this user was identified.

Further, at time 10:05, a printer job specified by the user name 'FUKUMOTO' and a page count of 1 was registered. This indicates that data to be recorded of a user having a user name 'FUKUMOTO' was transferred at that time from a personal computer to printer 1.

Also, at time 10:20, a copier job specified by the user name 'SUNAYAMA' and a page count of 100 was registered. This indicates that the copier function was started at that time by a user having a user name 'SUNAYAMA'.

Figure 6:
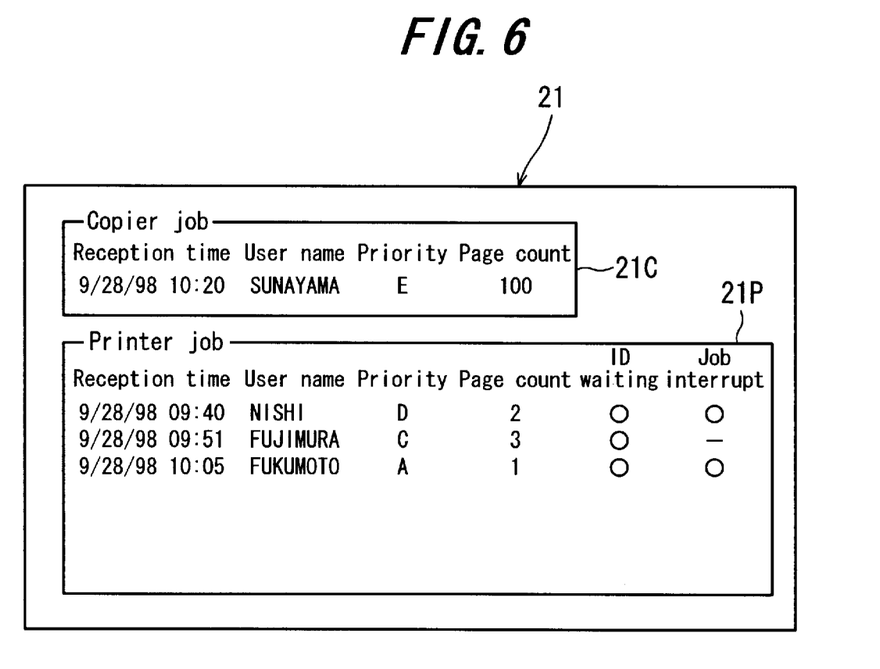
FIG. 6 is a diagram the management table shown in FIG. 3 with its content updated.

With the update of the content of reception/identification table 22, the content in management table 21 shown in FIG. 3 is updated as shown in FIG. 6. As understood from FIGS. 3 and 6, in copier job table 21C, the job specified by the user name 'FUJIHARA' was removed while a job having a user name 'SUNAYAMA', E-level priority and a page count of 100 was registered instead at time 10:20. In printer job table 21P, the job having a user name 'OCHI' was removed while a job having a user name 'FUKUMOTO', A-level priority and a page count of 1 with the ID-number waiting function needed and being 'allowed' to create an interrupt was registered instead at time 10:05.

Figure 7:
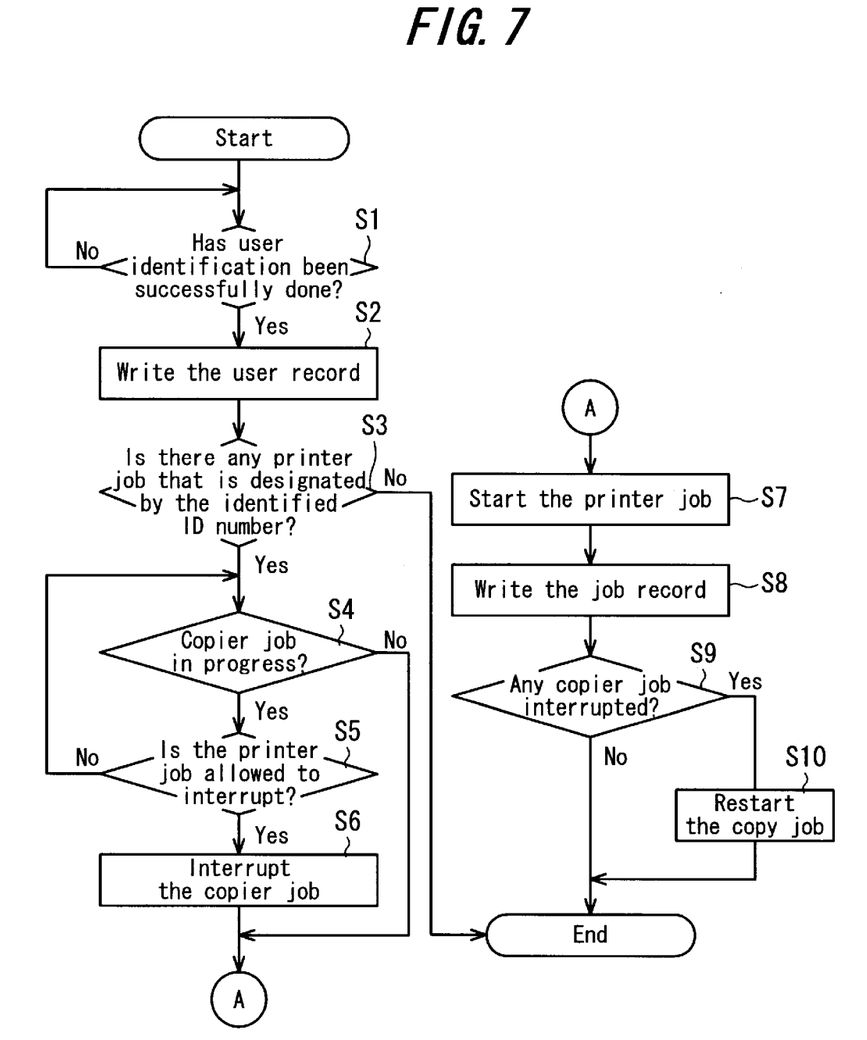
FIG. 7 is a flowchart showing a processing sequence of the printer of the present embodiment.

In parallel with the procedures as stated above, a sequence of operations shown by the flowchart in FIG. 7 is implemented whenever a user approaches printer 1.

First, user identifying portion 19 of printer 1 sends out the ID request signal as stated above and waits for reception of an ID number signal (Step S1). When a user enters within the radio wave communication coverage of user identifying portion 19, the ID card 6 of this user receives the ID request signal hence it sends out its user ID number signal. This ID number signal is received by user identifying portion 19. Controller 20 receives the ID number of the user via user identifying portion 19. When this ID number matches one of the multiple ID numbers in management memory 16, the controller judges that the user of the already informed ID number has approached printer 1 (Step S1, Yes). Then controller 20 reads out the user name corresponding to this ID number from the management memory 16 and writes the time at which this ID number was recognized, the user name into reception/identification table 22 (Step S2).

Subsequently, controller 20 compares the recognized user name (ID number) with the users (ID numbers) in printer job table 21P in management table 21 (Step S3). If the recognized user name matches none in table 21P (Step S3, No), this sequence shown in FIG. 7 is ended. When the recognized user name has a match in table 21P (Step S3, Yes), the operation goes to Step S4.

Figure 8:
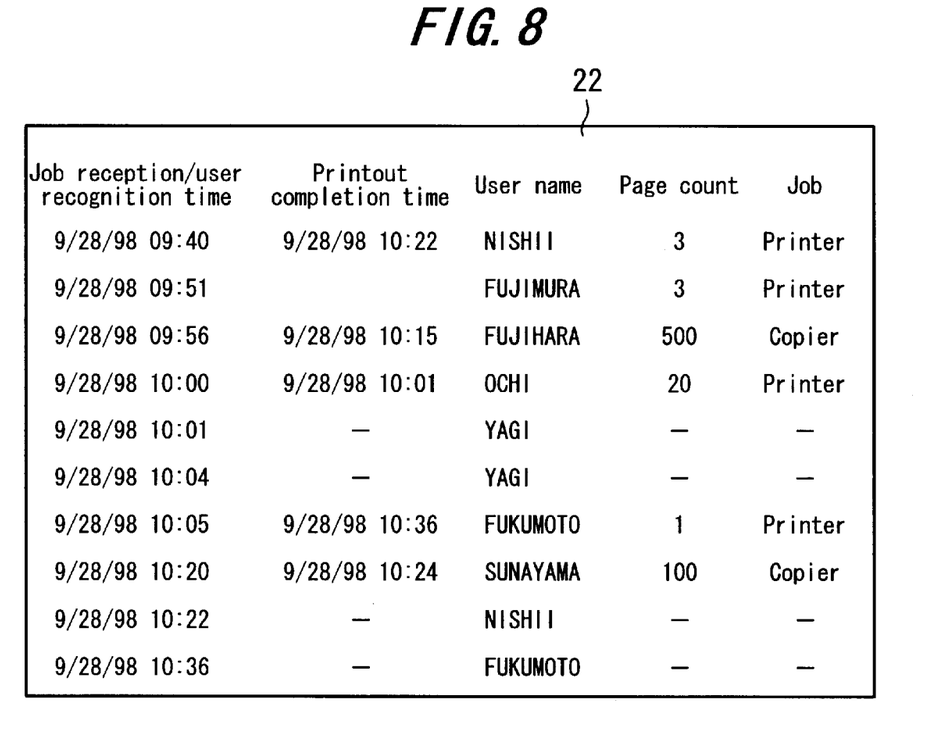
FIG. 8 is a diagram showing the reception/identification table shown in FIG. 5 with its content further updated.

For example, when an ID number signal is received at time 10:22 (Step S1, Yes) and if the user name of this ID number is 'NISHII', the content in reception/identification table 22 is updated as shown in FIG. 8 (Step S2). Since this user name 'NISHII' matches the user name 'NISHII' in printer job table 21P shown in FIG. 6 (Step S3, Yes), the operation goes to Step S4.

Then, controller 20 determines whether a copier job is being implemented (Step S4) and checks if the printer job of the user name recognized above can be implemented by creating an interrupt (Step S5). A case where the printer job of the user name recognized above is determined to be able to interrupt the job in progress is one where the job of the user name, recognized beforehand in printer job table 21P was registered as being 'allowed' to create an interrupt and the priority of the user name is higher than that of the copier job in table 21C.

When no copier job is implemented (Step S4, No), the operation goes to step S7, skipping Step S6. If a copier job is being implemented (Step S4, Yes) and the printer job is not allowed to make an interrupt (Step S5, No), the implementation of the printer job waits for the copier job to end. When the copier job completes (Step S4, No), the operation goes to Step S7, skipping Step S6. If a copier job is being implemented (Step S4, Yes) and the printer job is allowed to make an interrupt (Step S5, Yes), controller 20 interrupts the copier job (Step S6) and begins the printer job of the recognized user name (Step S7). When this printer job completes, the completion time is written into reception/identification table 22 (Step S8) and the printer job of the recognized user name is removed from printer job table 21P.

For example, as understood from the reception/identification table 22 shown in FIG. 8, when the user name 'NISHII' is recognized at time 10:22, the copier job specified by the user name 'SUNAYAMA' in the copier job table 21C of FIG. 6 is being implemented (Step S4, Yes). Since the printer job specified by the user name 'NISHII' in the printer job table 21P of FIG. 6 is registered as being 'allowed' to interrupt and since the user name 'NISHII' has the D-level priority, which is higher than the E-level priority of the copier job in table 21C (Step S5, Yes), the copier job of the user name 'SUNAYAMA' is interrupted (Step S6) and the printer job of the user name 'NISHII' is started (Step S7). When this printer job completes, the completion time is written into the reception/identification table 22 (Step S8) and the printer job of the user name 'NISHII' is removed from table 21P.

When the printer job ends in the above way, controller 20 checks if there are any interrupted copier job (Step S9). If there is (Step S9, Yes), the interrupted copier job is restarted (Step S10). If there are no copier job being interrupted (Step S9, No), the sequence of FIG. 7 is ended, skipping Step S10.

That is, in this sequence shown in FIG. 7, when a user approaches printer 1, the ID number (user name) of this user is detected. If a printer job having this user name has been registered in table 21P, it is checked whether the printer job of this user name is 'allowed' to interrupt and whether the priority is higher than that of the copier job. Then, after confirmation of these, the printer job specified by the user name starts its operation by interrupting the job in progress.

In this manner, in the present embodiment, copier jobs are implemented promptly as long as no printer job interrupt occurs. For a printer job where the ID number waiting function is 'not requested', the job is 'allowed' to interrupt and the priority for the user name is higher than that of the copier job, this printer job starts interrupting the job in progress without waiting for the user to approach the printer 1. When the ID number waiting function is 'needed', the job is 'allowed' to interrupt and the priority for the user name is higher than that of the copier job, this printer job will start interrupting the job in progress only when the user has come near to printer 1. By this management scheme of printer jobs and copier jobs, it is possible to handle both jobs without hindrance.

In a case where a printer job is being implemented by interrupting the job in progress, it is preferable that controller 20 displays in display portion 18 the fact that the current job runs in the job interrupt mode. In this case, the user who is performing a copier job is able to notice the occurrence of the job interrupt so that it is possible to timely separate the printed sheets produced by the copier job from those produced in the job interrupt mode, thus making it possible to avoid mix-up between different sets of printed sheets. Further, the user name of the printer job in progress may be also displayed in display portion 18 so as to enable two or more users approaching the printer 1 at the same time to know whose job is being currently implemented.

Figure 9:
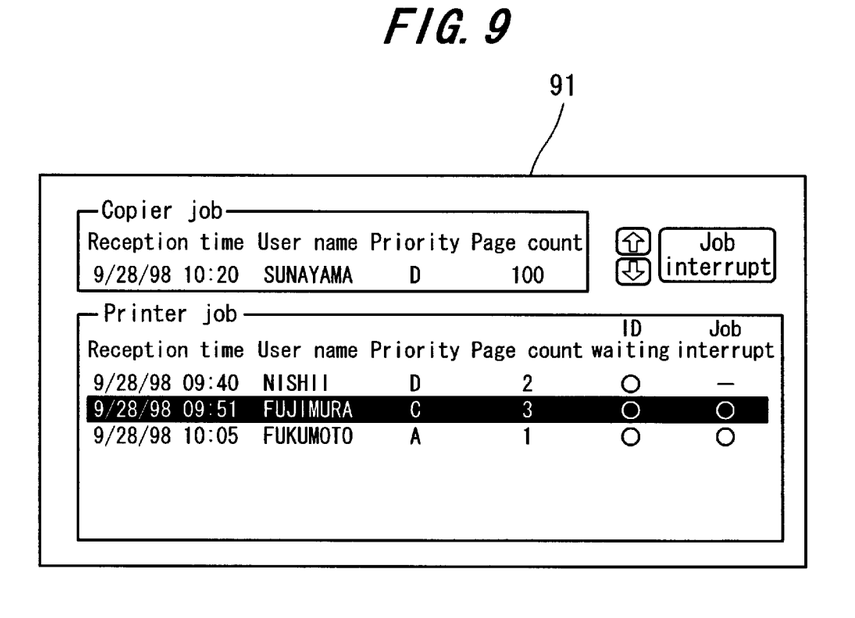
FIG. 9 is a diagram showing the display content in the display portion in the printer of the present embodiment.

Further, instead of determining whether a printer job should start interrupting the copier job in progress, based on their predetermined priorities, it is possible to allow the user to decide whether the printer job be implemented by making an interrupt. In this case, when the ID number of a user approaching printer 1 has been detected and the entry of a printer job of this ID number has been confirmed, controller 20 displays a display content 91 as shown in FIG. 9 in display portion 18. This user may view this display content 91 and designate whether or not to implement a job interrupt operation by operating control portion 17. Controller 20, only when a job interrupt operation is selected, starts the printer job by interruption. When the copier job has almost ended or when the printer job is not urgent, it is possible to make it an option to not interrupt. Thus, this configuration makes it possible for users to flexibly deal with a variety of situations.

Figure 10:
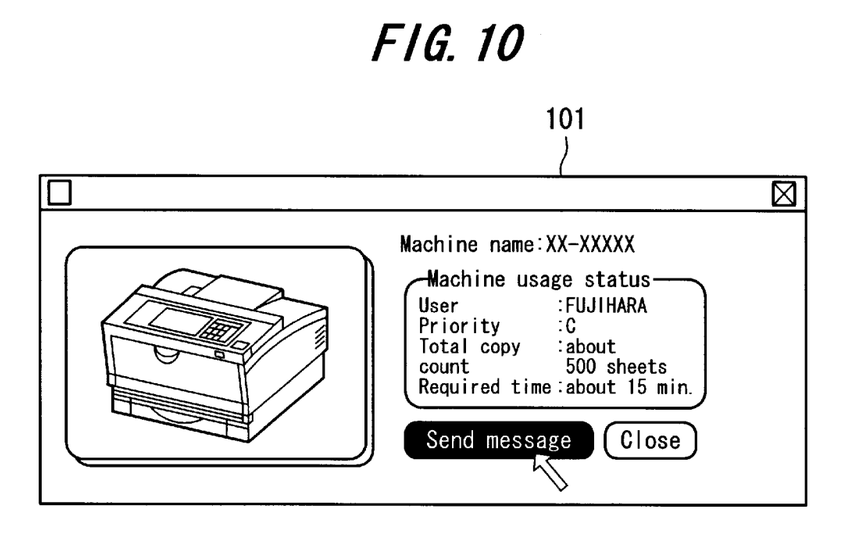
FIG. 10 is a diagram showing a display content in a personal computer on the network system shown in FIG. 1.

Further, since printer 1 is connected to terminals such as personal computers by network line 5, it is possible to exchange various display data among printer 1 and the terminals. For example, when printer 1 receives a printer job from a personal computer user, the printer 1 gives information about its usage status to the personal computer via network line 5. The personal computer displays usage status 101 of printer 1 on its display screen as shown in FIG. 10. The user, taking into account this usage status 101, sends information as to whether the user's job needs the ID number waiting function and as to whether the job should be allowed to interrupt, via network line 5.

Figure 11:
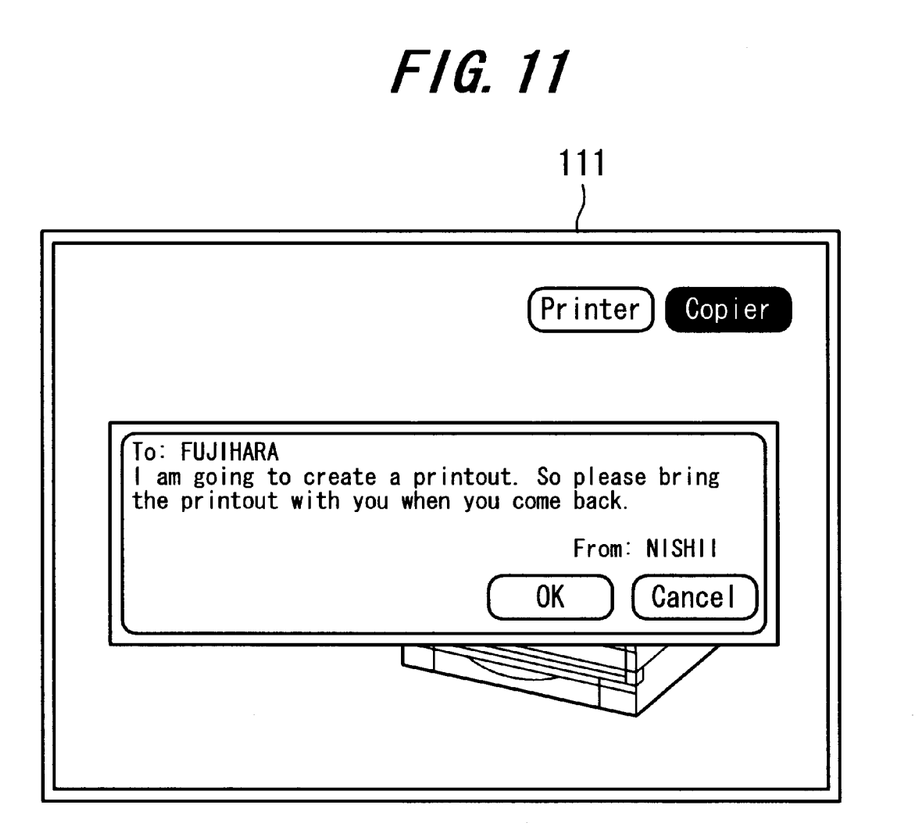
FIG. 11 is a diagram showing another display content in the display portion in the printer of the present embodiment.

Further, one printer user, viewing the usage status of FIG. 10, may input a message 111 as shown in FIG. 11 if another user using the printer 1 as a copier is the vicinity and may send the message to printer 1 via network line 5. Printer 1 receives the message 111 and displays it on display portion 18.

Further, printer 1 may print the data in reception/identification table 22 onto the recording paper and discharge the printout when a user requests or at a predetermined time. Printer 1 may transfer this data to a terminal in response to a transfer request therefrom. Since the data in this reception/identification table 22 includes the names of users who have approached printer 1, when, for example, some printout is missing this feature is useful in postulating a person who carried it away by mistake.

The present invention should not be limited to the above embodiment and many modifications can be added. For example, the order of priorities registered in management table 21 is set based on the times at which printer jobs and copier jobs are accepted instead of setting them in correspondence with ID numbers (user names). Alternatively, certain priority rules based on which the order of priority can be determined with reference to user name, job reception time, number of pages to be printed, and other factors may be made beforehand, and the priority level may be determined based on the priority rules. Also any other way may be used to determine the interrupt priorities.

When the data from facsimile machine 4 needs to be printed, the top priority may be given to this data. Alternatively, different priority may be given to each of the terminals or other devices which supply data to be recorded to the printer.

Figure 12:
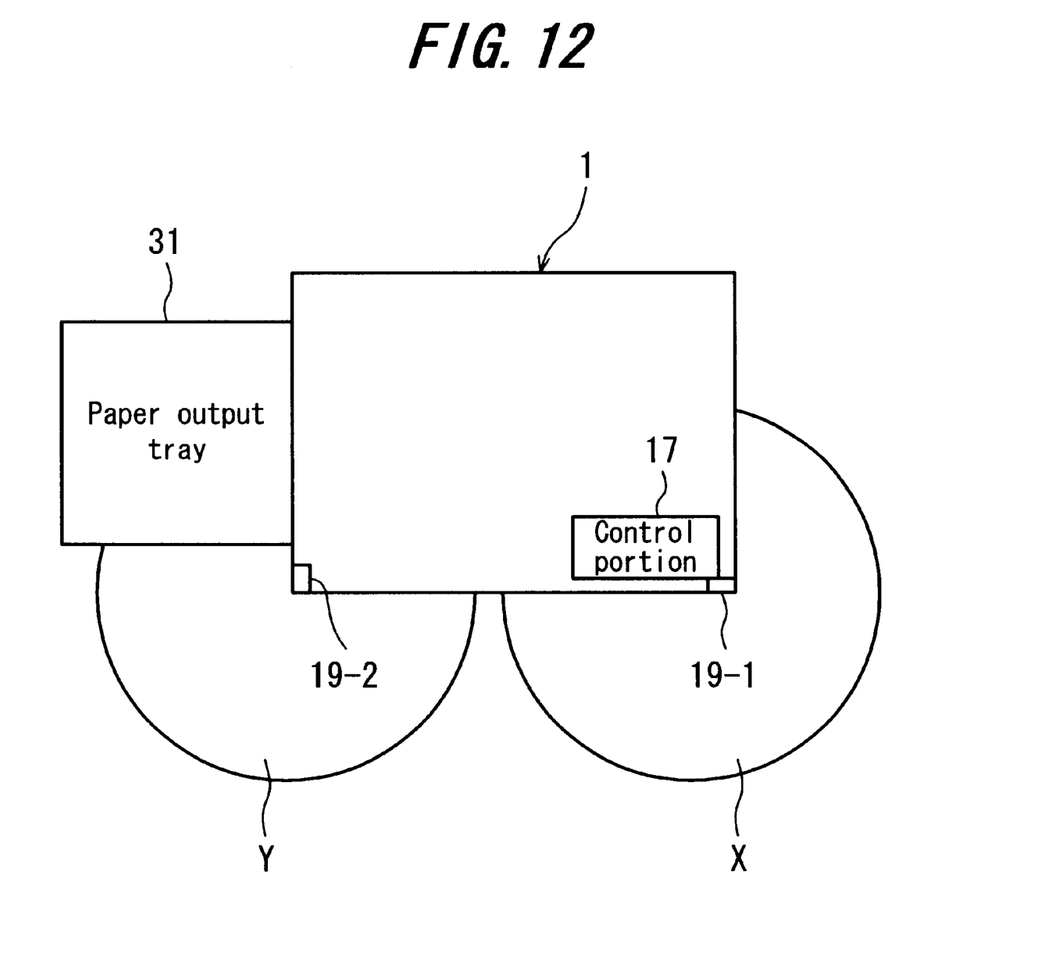
FIG. 12 is a diagram showing a variational example of a user identifying portion in the printer of the present embodiment.

A multiple number of user identifying portions 19 may be arranged at different sites. Illustratively, as shown in FIG. 12, a user identifying portion 19-1 for detecting the user entering a radio wave coverage X around control portion 17 of printer 1 and another user identifying portion 19-2 for detecting the user entering another radio wave coverage Y around paper output tray 31 for recorded sheets may be provided. When a user is identified by user identifying portion 19-1, the user is regarded as coming for a copier job whereas when a user is identified by user identifying portion 19-2, the user is regarded as coming for collecting a printout of a printer job.

As described heretofore, according to the present invention, when a user approaches the printer, this user is identified so as to determine whether the priority of the input functional device of the user is higher than the other input functional device through which data to be recorded has been input. If the priority of the input functional device of this user is higher than the others, the printing of the data input through the input functional device of the user is started by making an interrupt. For example, suppose the input functional device of a user is an external terminal that supplies data to be recorded to the printer via the network and another input functional device is an entity that scans original images by the copier function and supplies data to the printer. When a user approaches the printer after they have sent data to be recorded from the external terminal and is identified and if the input functional device of the user has a higher priority, the printing of the data sent from the external terminal is started by interrupting the printing of images by the copier function even if it is in progress. Therefore, the user dose not have to wait.

In the present invention, if a printing job is implemented by making an interrupt, the identification data representing the user and the indication that it is performed by job interrupt are displayed. Therefore, the user can correctly and immediately notice the occurrence of the job interrupt so that it is possible to timely collect the printed sheets of the data produced by the job interrupt mode from those produced by the interrupted job, avoiding mix-up of one by the other. Further this configuration makes it possible for two or more users, if approaching the printer at the same time, to know whose job of data is being currently implemented.

Next, according to the present invention, if a user approaches the printer, this user is identified so that the input functional device of the user and other input functional device through which data to be recorded has been input are displayed. When printing of the data input through the input functional device of the user is commanded to start by making an interrupt, the printing of the data is started in the job interrupt mode. For example, suppose the input functional device of a user is an external terminal that supplies data to be recorded to the printer via the network and another input functional device is an entity that scans original images by the copier function and supplies data to the printer. When a user approaches the printer after they have sent data to be recorded from the external terminal and is identified, the printing of the data of the user is started in response to the command of allowing the printing job of the data of the user to make an interrupt, by interrupting the printing of images by the copier function. Therefore, the user dose not have to wait.

Since a job interrupt is designated by the user, it is possible to make an interrupt taking into account the printing status of images by the copier function. Therefore, the user is able to avoid an abrupt interruption.

In the present invention, the printing status of data to be recorded input through other input functional device is informed to external terminals and messages from an external terminal are displayed on the printer side. Therefore, it is possible on the external terminal side to determine whether a job interrupt for a printing job may be approved without going to the printer site. Also it is possible to send a message from a user on one external terminal to other printer users.

Finally, in the present invention, since the information of printer' past operation records and the users identified by the identifying portion can be displayed and supplied to the external terminals, it is possible to postulate the person involved, if, for example, someone by mistake carried away a printout of another person. In such a case, an e-mail of the inquiry message can be sent via the network to the terminal of the person, or the terminals of all the people, who might have carried away the printout by mistake.

What is claimed is:

1. An image forming apparatus having a multiple number of input functional devices connected thereto and producing printouts from the data to be recorded input through these input functional devices, comprising:

an identifying means which identifies the user when a user of one of the input functional devices approaches the image forming apparatus;

a comparing means which, after the user is identified by the identifying means, compares the priority of the input functional device of the user with that of another input functional device through which other data to be recorded has been input to the image forming apparatus, based on the priority rules determined beforehand in relation with the input functional devices; and a job interrupt means which starts the printing of the data to be recorded input through the input functional device of the user by making a job interrupt when the priority of the input functional device of the user is determined by the comparing means to be higher than that of the other input functional device through which other data to be recorded has been input to the image forming apparatus.

2. An image forming apparatus according to claim 1, further comprising:

a display means which, while printing of a job is being implemented by job interrupt, displays the identification data identifying the user and that the printing job in progress is implemented in a job interrupt mode.

3. An image forming apparatus having a multiple number of input functional devices connected thereto and producing printouts from the data to be recorded input through these input functional devices, comprising:

an identifying means which identifies the user when a user of one of the input functional devices approaches the image forming apparatus;

a usage status displaying means which, after the user is identified by the identifying means, displays the input functional device of the identified user and another input functional device through which other data to be recorded has been input to the image forming apparatus;

a control means for designating job interrupt for implementation of the printing job of the data input through the input functional device of the user; and a job interrupt means which, when job interrupt is designated by the control means, starts the printing of the data input through the input functional device of the user by making an interrupt.

4. An image forming apparatus according to claim 1 or 3, further comprising:

a notifying means for giving a notice as to the print status of the other input functional device through which data to be recorded has been input to external terminals.

5. An image forming apparatus according to claim 1 or 3, further comprising:

a message display means for displaying messages from external terminals.

6. An image forming apparatus according to claim 1 or 3, further comprising:
   a log and user name display means for displaying past records of printing operations of the image forming apparatus and the users identified by the identifying means.

7. An image forming apparatus according to claim 1 or 3, further comprising:
   a notifying means for giving information as to past records of printing operations of the image forming apparatus and the users identified by the identifying means, to external terminals.

8. A system comprising an image forming apparatus and a terminal device, where the image forming apparatus is connected to the terminal device via a network, wherein:

the image forming apparatus includes:
   a first display means for displaying message information transferred from the terminal device via the network, and
   a transfer means for transferring a usage status of the image forming apparatus to the terminal device via the network; and the terminal device includes:
   a message inputting means for inputting the message information, and
   a second display means for displaying the usage status transferred via the network.

* * * * *